United States Patent
KN et al.

(10) Patent No.: US 10,579,027 B2
(45) Date of Patent: Mar. 3, 2020

(54) REDUNDANT UNIVERSAL IO MODULES WITH INTEGRATED GALVANICALLY ISOLATED (GI) AND INTRINSICALLY SAFE (IS) BARRIERS

(71) Applicant: Honeywell International Inc., Morris Plains, NJ (US)

(72) Inventors: Dinesh Kumar KN, Bangalore (IN); Murali Krishna Bezawada, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 351 days.

(21) Appl. No.: 15/604,339

(22) Filed: May 24, 2017

(65) Prior Publication Data

US 2018/0343763 A1    Nov. 29, 2018

(51) Int. Cl.
| | | |
|---|---|---|
| *G05B 15/02* | (2006.01) | |
| *G06F 13/40* | (2006.01) | |
| *G05B 9/03* | (2006.01) | |

(52) U.S. Cl.
CPC .............. *G05B 15/02* (2013.01); *G05B 9/03* (2013.01); *G06F 13/409* (2013.01)

(58) Field of Classification Search
CPC .......... G05B 15/02; G05B 9/03; G06F 13/409
See application file for complete search history.

(56) References Cited

U.S. PATENT DOCUMENTS

| | | | |
|---|---|---|---|
| 5,712,631 A | 1/1998 | Lewis et al. | |
| 6,154,683 A * | 11/2000 | Kessler | G05B 19/0423 |
| | | | 700/150 |
| 6,397,322 B1 * | 5/2002 | Voss | H02H 9/008 |
| | | | 340/532 |
| 6,885,949 B2 | 4/2005 | Selli | |
| 6,896,536 B1 | 5/2005 | Nguyen et al. | |
| 7,412,548 B2 | 8/2008 | Sichner | |
| 7,991,931 B2 | 8/2011 | Schmidt et al. | |
| 8,392,626 B2 | 3/2013 | Wormmeester et al. | |
| 8,656,065 B1 | 2/2014 | Gerhart et al. | |

(Continued)

FOREIGN PATENT DOCUMENTS

| | | |
|---|---|---|
| DE | 19512372 A1 | 10/1996 |
| EP | 0147702 A2 | 7/1985 |

(Continued)

OTHER PUBLICATIONS

David Hohenstein, "Intrinsic Safety in a Nutshell, Technical White Paper", Pepperl+Fuchs, 2009, 4 pages.

(Continued)

*Primary Examiner* — Scott Bauer

(57) ABSTRACT

A system includes a back plane having at least one primary module and at least one secondary module that is redundant to the at least one primary module. The back plane is configured to limit energy from the at least one primary module and the at least one secondary module to a field device. The at least one primary module includes a first plurality of channels and is configured to provide channel to channel isolation among the first plurality of channels. The at least one secondary module includes a second plurality of channels and is configured to provide channel to channel isolation among the second plurality of channels.

18 Claims, 3 Drawing Sheets

(56) References Cited

U.S. PATENT DOCUMENTS

| | | | |
|---|---|---|---|
| 9,252,507 | B2 | 2/2016 | Nagasaki et al. |
| 9,252,513 | B2 | 2/2016 | Masuda et al. |
| 9,263,809 | B2 | 2/2016 | Assif et al. |
| 9,361,247 | B1 | 6/2016 | Kumar Kn et al. |
| 9,411,769 | B2 * | 8/2016 | Erni .................... G05B 19/4185 |
| 2004/0019440 | A1 | 1/2004 | Selli |
| 2004/0252428 | A1 * | 12/2004 | Junker .................... H02H 9/008 361/58 |
| 2005/0024160 | A1 * | 2/2005 | Vazach .............. G05B 19/0423 333/81 R |
| 2010/0222936 | A1 * | 9/2010 | Helfrick ............ H04L 12/40045 700/292 |
| 2016/0043560 | A1 * | 2/2016 | Marks ....................... H02J 1/10 307/62 |
| 2016/0239007 | A1 | 8/2016 | Cunningham et al. |

FOREIGN PATENT DOCUMENTS

| | | |
|---|---|---|
| EP | 1653305 A2 | 5/2006 |
| WO | 2005086110 A2 | 9/2005 |
| WO | 2012161942 A2 | 11/2012 |
| WO | 2013110296 A1 | 8/2013 |
| WO | 2015174979 A1 | 11/2015 |

OTHER PUBLICATIONS

"SMART Universal Barrier", Pepperl+Fuchs, May 2016, 5 pages.
Paul S. Babiarz, "Intrinsic Safety Circuit Design", Omega Engineering, Oct. 1993, p. Z131-Z148.
Dinesh Kumar KN, "Energy Limiting Barrier for Universal IO in Intrisically Safe Industrial Applications", U.S. Appl. No. 15/287,180, filed Oct. 6, 2016, 20 pages.
Dinesh Kumar KN, "Intelligent Field Input/Output (I/0) Terminal for Industrial Control and Related System and Method", U.S. Appl. No. 15/448,219, filed Mar. 2, 2017, 33 pages.

* cited by examiner

REDUNDANT UNIVERSAL IO MODULES WITH INTEGRATED GALVANICALLY ISOLATED (GI) AND INTRINSICALLY SAFE (IS) BARRIERS

TECHNICAL FIELD

This disclosure relates generally to industrial process control and automation systems. More specifically, this disclosure relates to an energy limiting barrier for a universal IO in intrinsically safe industrial applications.

BACKGROUND

Industrial process control and automation systems are often used to automate large and complex industrial processes. These types of systems routinely include various components including sensors, actuators, and controllers. Some of the controllers can receive measurements from the sensors and/or connected input/output (I/O) subsystems and generate control signals for the actuators.

Existing process control and automation systems typically have hardware components participating in control and I/O functions that are installed in a control room and/or the field. These systems are often used to gather I/O information from the field, which is transmitted to the control room. The systems in the control room can perform various control functions and transmit outputs back to the field.

In hazardous environments, it may be necessary or desirable to energy limit and isolate critical I/O functions using an intrinsically safe barrier. Intrinsic safety (IS) is a protection technique for safe operation of electrical equipment in hazardous areas by limiting the electrical or thermal energy available for ignition. This is typically achieved through the use of one or more IS barriers.

SUMMARY

This disclosure provides an integrated energy limiting barrier and galvanic isolation for a redundant set of universal IO in intrinsically safe industrial applications.

In a system includes a back plane including at least one primary module and at least one secondary module that is redundant to the at least one primary module. The back plane is configured to limit energy from the at least one primary module and the at least one secondary module to a field device. The at least one primary module includes a first plurality of channels and is configured to provide channel to channel isolation among the first plurality of channels. The at least one secondary module includes a second plurality of channels and is configured to provide channel to channel isolation among the second plurality of channels.

In a second embodiment, a system includes a power supply, a controller, and a back plane including at least one primary module and at least one secondary module that is redundant to the at least one primary module. The back plane is configured to limit energy from the at least one primary module or the at least one secondary module to a field device. The at least one primary module includes a first plurality of channels and is configured to provide channel to channel isolation among the first plurality of channels. The at least one secondary module including a second plurality of channels and is configured to provide channel to channel isolation among the second plurality of channels.

In a third embodiment, a system includes a primary module, at least one secondary module, and a back plane. The primary module is configured to provide isolation between a safe zone and a hazard zone. The at least one secondary module is redundant to the primary module and is configured to provide isolation between a safe zone and a hazard zone. The back plane is coupled between the primary module and the at least one secondary module and is configured to limit energy provided to a field device from the primary module or the secondary module.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
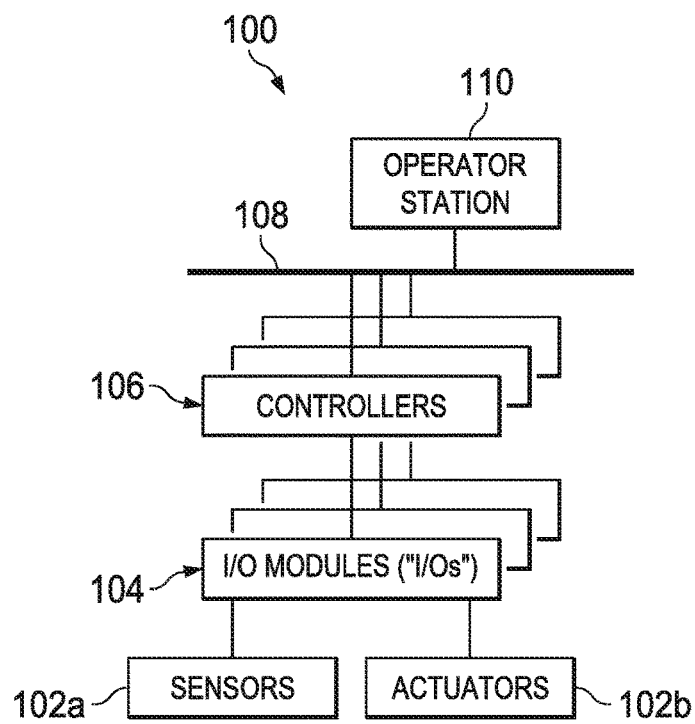
FIG. 1 illustrates a portion of an example industrial process control and automation system according to this disclosure.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module (sometimes referred to simply as "IO") 104 is coupled to the sensors 102a and actuators 102b. The IOs 104 facilitate interaction with the sensors 102a, actuators 102b, or other field devices. For example, an IO 104 could be used to receive one or more analog inputs (AIs), digital inputs (DIs), digital input sequences of events (DISOEs), or pulse accumulator inputs (PIs) or to provide one or more analog outputs (AOs) or digital outputs (DOs). Each IO 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the IO(s) 104. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

In process control and automation systems such as the system 100, I/O channels are used to connect controllers (such as the controller 106) and field devices (such as the sensors 102a and actuators 102b). In general, IOs 104 can support I/O channels of various types, including analog inputs (AIs), digital inputs (DIs), digital input sequences of events (DISOEs), pulse accumulator inputs (PIs), analog outputs (AOs), or digital outputs (DOs). Different I/O channel types are characterized by different inputs, outputs, voltages, currents, and configurations. For example, AI and AO channels are typically of the 4-20 mA type, but they could also include thermocouples and the like. In contrast, DI and DO channels typically include other configurations.

A universal I/O (UIO) channel is a specialized I/O channel that is reconfigurable to operate as any of multiple I/O channel types. Example types of UIO circuits are shown in U.S. Pat. Nos. 8,072,098; 8,392,626; U.S. Pat. No. 8,656,065; and U.S. Patent Publication No. 2015/0278144 (all of which are hereby incorporated by reference in their entirety). UIO circuits that support UNIVERSAL CHANNEL TECHNOLOGY available from HONEYWELL INTERNATIONAL INC. are also suitable for use.

A UIO channel could have a current output in various configurations, regardless of the I/O type of the field device to which the UIO channel is connected. Often times, the current output is used to measure a corresponding signal. As discussed above, it may be necessary or desirable in some systems to utilize intrinsically safe (IS) barriers to achieve intrinsic safety where hazardous or potentially hazardous conditions may exist. Existing IS barriers are available for use in conjunction with I/O channels, but most IS barriers are configured for use with an I/O channel of a particular I/O type (such as AI or DO).

An IO supporting one or more UIO channels (referred to as a "UIO module" or simply a "UIO") may use one or more external IS barriers to interface to field devices in hazardous or potentially hazardous locations. In systems that utilize UIOs, low-cost IS barriers that can be installed in the field close to the terminal modules may be an important or critical requirement. However, the use of currently-available third party barriers can be complex and cost prohibitive. Also, existing IS barriers may require additional cabinets for installation, which further increases the size and cost of the implementation.

In accordance with this disclosure, various components in the system 100 could be designed or modified to support an IS energy limiting barrier for use with a UIO. For example, one or more of the sensors 102a and actuators 102b could be disposed in a hazardous or potentially hazardous zone, while one or more of the controllers 106 could be implemented in a safe zone. Moreover, an IO 104 may be used to connect one or more of the controllers 106 and one or more of the sensors 102a and actuators 102b. In some embodiments, the IO 104 represents a UIO. An IS barrier may be integrated into the IO 104 to ensure intrinsic safety. Additional details regarding the IO 104 and the IS barrier are provided below.

Although FIG. 1 illustrates one example of an industrial process control and automation system 100, various changes may be made to FIG. 1. For example, the system 100 could include any number of sensors, actuators, I/O modules, controllers, operator stations, networks, IS barriers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which an IS energy limiting barrier can be used with a UIO. This functionality can be used in any other suitable system, and the system need not be related to industrial process control and automation.

Figure 2:
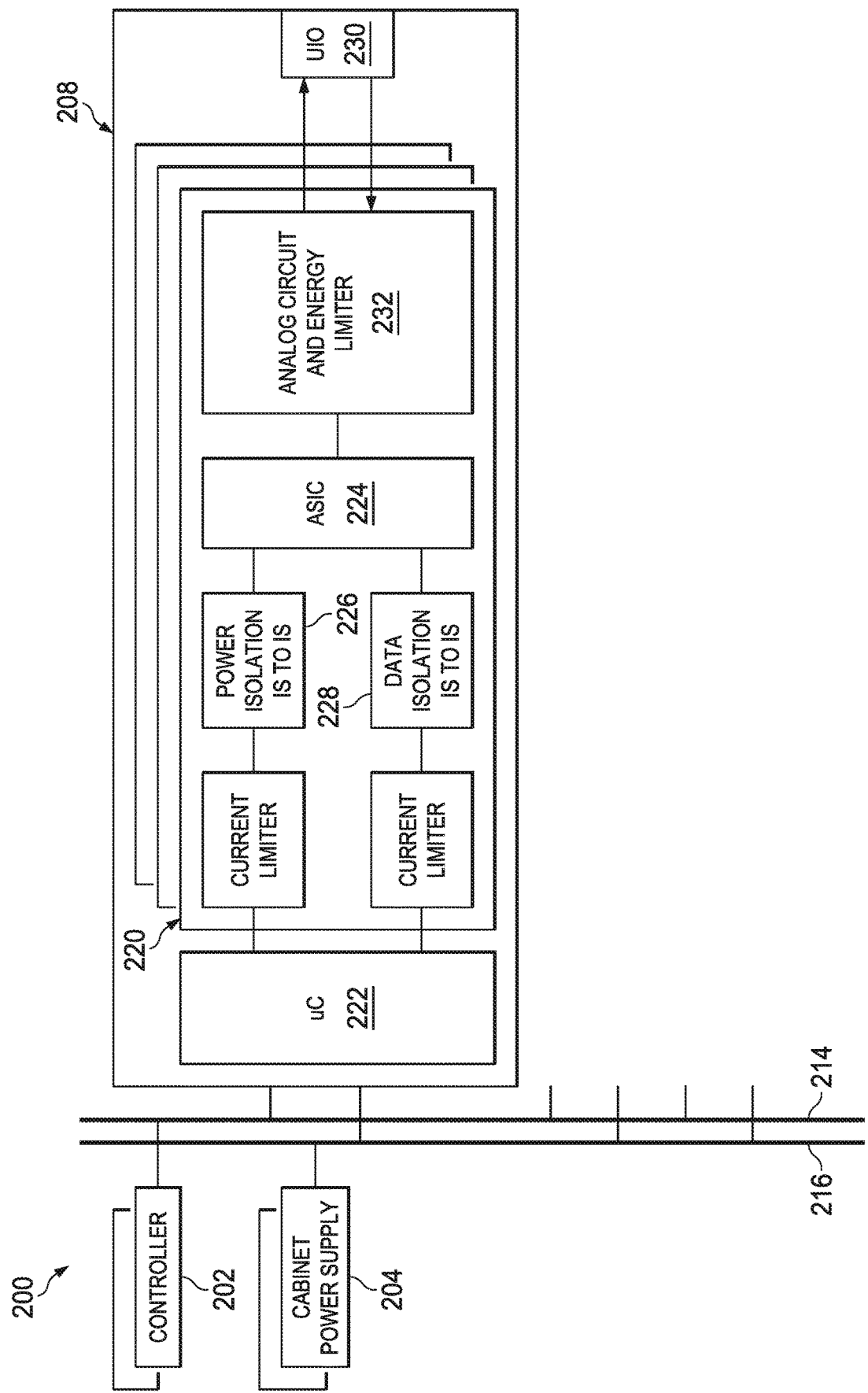
FIG. 2 illustrates an example system in which an isolated energy barrier and an intrinsically safe (IS) barrier are used with a universal input/output (UIO) device according to this disclosure.

FIG. 2 illustrates an example system 200 that utilizes an IS barrier integrated with a UIO according to this disclosure. The system 200 may actually denote a portion of the system 100 shown in FIG. 1. However, the system 200 could be used as part of any other suitable larger system.

As shown in FIG. 2, the system 200 includes a controller 202, a power supply 204, and an intrinsic safety (IS) module 208. The system 200 may be incorporated into an enclosure that may be located in the field. The enclosure can be a field junction box, a marshaling cabinet, a remote equipment enclosure, an intrinsic barrier enclosure, or a control system cabinet in the control room.

The controller 202 includes any suitable control system hardware (or combination of hardware and software/firmware) for interacting with or controlling one or more of the field devices. The controller 202 could, for example, represent a multivariable controller, such as a RMPCT controller or other type of controller implementing MPC or APC. As a particular example, the controller 202 could represent one of the controllers 106 of FIG. 1.

The IS module 208 is a programmable channel circuit that includes UIO channels and bi-directional I/O terminals. In some embodiments, the IS module 208 can be configured for a predetermined mode or the IS module 208 may automatically select one of multiple modes for each channel depending on the I/O type of the field device connected to the corresponding UIO channel. One characteristic of the IS module 208 is that, regardless of the I/O type of the field device, the IS module 208 provides a current output. That is, in contrast to some IOs that generate or process a voltage output, the IS module 208 can provide a current output regardless of the I/O type of the associated field device. The IS module 208 may accommodate, for example, eight channels 220. Other embodiments of the IS module 208 may contain more or fewer UIO channels. Each channel 220 may be provided with dedicated galvanic isolation and the IS module 208 may provide channel to channel isolation. The IS module 208 is configured for live insertion and removal from an enclosure.

The IS module 208 includes a programmable device such as a processor 222. The processor 222 generally operates to process data and control the overall operation of the IS module 208. The processor 222 may also perform diagnostics on the IS module 208 and/or the field devices (e.g., sensors 102a and/or actuators 102b) connected thereto. The processor 222 denotes any suitable processing device, such as a CPU, AP, or CP.

Each channel 220 in the IS module 208 includes an IO specific circuit 224 such as a UIO application specific integrated circuit (ASIC) that communicates with the processor 222 across galvanic isolation modules 226 and 228. The ASIC 224 represents an integrated circuit (IC) that processes data and controls operation of an interface 230 (e.g., a UIO interface). The ASIC 224 denotes any suitable (IC) for handling one or more I/O functions. The interface 230 controls transmission and reception of signals between the IS module 208 and the field devices. The interface 230 is configured to provide a plurality of inputs and outputs such as AI, AO, DI, DO, PI, etc. A galvanic isolation module 226 may provide power isolation by utilizing, for example, a transformer, while another galvanic isolation module 228 may provide data isolation by means of an optical or capacitive isolator.

The circuitry 232 of each channel 220 limits the energy output between the IS module 208 and the field device corresponding to that channel. For example, the circuitry 232 of each channel can limit output current, voltage, power, or a combination of these. The circuitry 232 can include any suitable structure or components for achieving an energy limiting function. For example, the circuitry 232 can include passive circuit elements, active circuit elements, or a combination of the two. Passive circuit elements include, but are not limited to, resistors, capacitors, inductors, transformers, Zener diodes, and the like. Active circuit elements include, but are not limited to, transistors, silicon-controlled rectifiers (SCRs), and the like. In a passive system, current at the input of the circuitry 232 is received and then limited by one or more passive circuit elements before the current is output. In an active system where the input current is completely isolated from the output current, the input signal is actively monitored and replicated at a safe current level at the output side. Thus, the circuitry 232 limits the energy to the field device regardless of the type of input or output signal without mechanical or software reconfiguration.

The IS module 208 may include a current limiting scheme and channel to channel isolation as well as channel to back end isolation, which may include controller 202 and power supply 204. The IS module 208 also provides IS to IS isolation within IS module 208.

Although FIG. 2 illustrates one example of a system 200 in which an IS barrier is integrated into a UIO, various changes may be made to FIG. 2. For example, various components in FIG. 2 could be combined, further subdivided, or omitted and additional components could be added according to particular needs. Also, process control and automation systems can come in a wide variety of configurations, and FIG. 2 does not limit this disclosure to any particular configuration.

Figure 3:
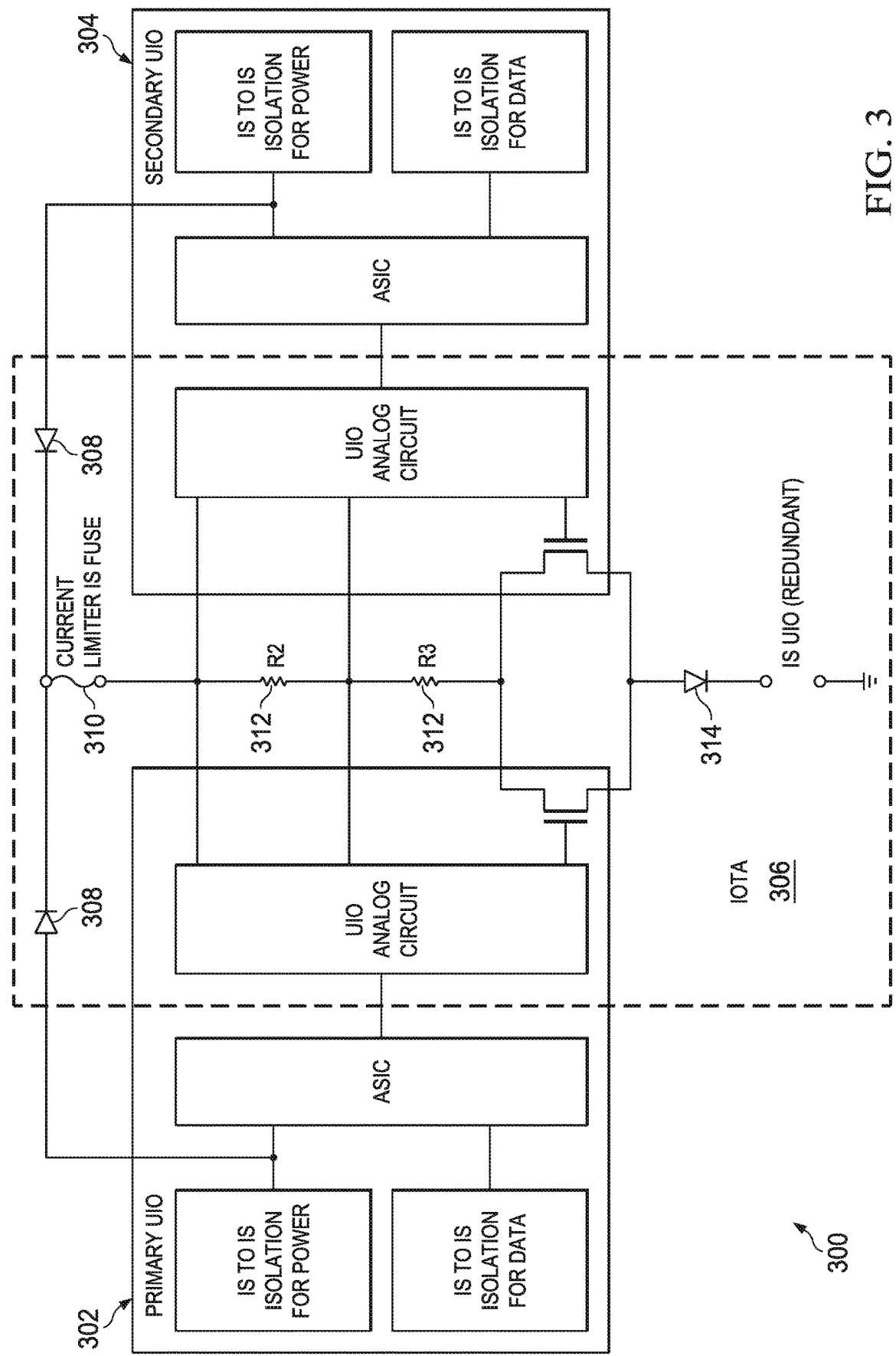
FIG. 3 illustrates an example system in which redundant UIO devices having an IS barrier are arranged according to this disclosure.

FIG. 3 illustrates a system 300 in which redundant IS modules are provided for a single channel according to this disclosure. The system 300 can include one or more components in common with the system 200 of FIG. 2 and may be used in the systems 100 and 200 of FIGS. 1 and 2. However, the system 300 could be used as part of any other suitable system.

As shown in FIG. 3, the system 300 includes a primary IS module 302 and a secondary IS module 304. When the IOs from the primary IS module 302 and the secondary IS module 304 are combined, such combination may lead to concerns regarding the summing of energy the context of intrinsic safety. The concerns may be overcome by having a single set of common components for current limiting which can be placed in a back plane such as an input/output termination assembly (IOTA) 306. These components may need additional protection to ensure that the power rating & thermal ratings are in control. For that purpose, a set of series diodes 308 and IS rated fuses 310 are implemented in series with the current limiting resistors 312. Before connecting to the final UIO terminal, there is a set of series of diodes 314 that may be incorporated to ensure some of the entity parameters are not deviated.

The system shown in FIG. 3 may allow redundant modules to get qualified for IS standards. Such standards may include isolation and voltage limiting that takes place in a redundant system, energy limiting that is passive in nature in the common back plane, and current limiting occurring through the common resistor, diode, and/or fuse combination (e.g., on the IOTA) for each channel. The isolation requirements may be taken care of by the IS-IS isolation provided for each channel for power as well as data. The system shown in FIG. 3 may allow more relaxed creepage and clearance requirements at the isolation component level since the Um for the IS module will be limited to a predetermined voltage, e.g., a voltage lower than 250 V, which would help for high channel density. The current limiting resistor (protected with a dedicated IS fuse) can help to qualify the system as a 1:1 redundant system for IS. The system of FIG. 3 is merely an example of one implementation that may be used for the IS module as part of a distributed protection scheme. For instance, the number of resistors, diodes, and/or fuses may be changed so that the system 300 may provide a 1:N redundant system.

Although FIG. 3 illustrates one example of a redundant system 300, various changes may be made to FIG. 3. For example, various components in FIG. 3 could be combined, further subdivided, or omitted and additional components could be added according to particular needs. Also, process control and automation systems can come in a wide variety of configurations, and FIG. 3 does not limit this disclosure to any particular configuration.

Figure 4:
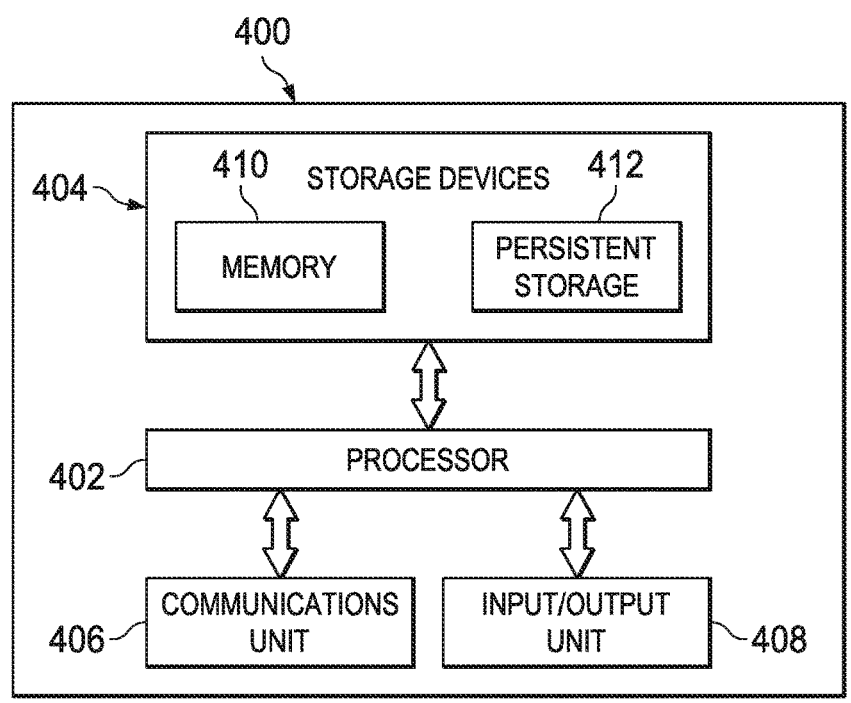
FIG. 4 illustrates an example device for use with an IS barrier and a UIO in a distributed control system according to this disclosure.

FIG. 4 illustrates an example device 400 for use with an IS module in a distributed control system according to this disclosure. The device 400 could, for example, represent a computing device in the system 100 of FIG. 1, such as one of the controllers 106 or one of the operator stations 110. As another example, various components of the device 400 could be included in the systems 200 and 300, such as in the IS module 208 or the IOTA 306. The device 400 could represent any other suitable device or components for performing functions associated with an IS barrier and a UIO in a distributed control system.

As shown in FIG. 4, the device 400 includes at least one processor 402, at least one storage device 404, at least one communications unit 406, and at least one input/output (I/O) unit 408. Each processor 402 can execute instructions, such as those that may be loaded into a memory 410. Each processor 402 denotes any suitable processing device, such as one or more microprocessors, microcontrollers, digital signal processors, application specific integrated circuits (ASICs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 could include at least one network interface card or wireless transceiver facilitating communications over at least one wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

Although FIG. 4 illustrates one example of a device 400 for use with an IS module in a distributed control system, various changes may be made to FIG. 4. For example, various components in FIG. 4 could be combined, further subdivided, or omitted and additional components could be added according to particular needs. Also, computing devices can come in a wide variety of configurations, and FIG. 4 does not limit this disclosure to any particular configuration.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, e.g., a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a back plane including at least one primary module and at least one secondary module that is redundant to the at least one primary module, the back plane is configured to limit energy from the at least one primary module and the at least one secondary module to a field device,
   wherein the at least one primary module includes a first plurality of channels, the primary module is configured to provide channel to channel isolation and voltage limiting among the first plurality of channels, and
   wherein the at least one secondary module including a second plurality of channels, the secondary module is configured to provide channel to channel isolation and voltage limiting among the second plurality of channels.

2. The system of claim 1, wherein each channel in the at least one primary module or the at least one secondary module comprises:
   an interface configured to communicate with the field device;
   a processing device configured to process data from the field device and control operations of the interface; and
   at least one galvanic isolation module configured to provide the channel to channel isolation.

3. The system of claim 1, wherein each channel is configured to receive multiple types of input or output signals from the field device.

4. The system of claim 1, wherein the at least one primary module and the at least one secondary module is configured to provide 1:N redundancy where N is a number of secondary modules.

5. The system of claim 1, wherein each channel further comprises a circuit configured to limit energy to the field device regardless of a type of input or output signal without reconfiguration.

6. The system of claim 1, wherein each of the at least one primary module and the at least one secondary module further comprises of voltage clamping circuit configured to limit a voltage applied on a plurality of channels.

7. The system of claim 1, wherein the back plane further comprises an energy limiting circuit.

8. The system of claim 1, wherein each of the at least one primary module and the at least one secondary module is configured to provide power isolation.

9. The system of claim 1, wherein each of the at least one primary module and the at least one secondary module is configured to provide data isolation.

10. A system comprising:
    a power supply;
    a controller;
    a back plane including at least one primary module and at least one secondary module that is redundant to the at least one primary module, the back plane is configured to limit energy from the at least one primary module and the at least one secondary module to a field device,
    wherein the at least one primary module includes a first plurality of channels, the primary module is configured to provide channel to channel isolation among the first plurality of channels, and
    wherein the at least one secondary module including a second plurality of channels, the secondary module is configured to provide channel to channel isolation among the second plurality of channels.

11. The system of claim 10, wherein each channel in the at least one primary module or the at least one secondary module comprises:
    an interface configured to communicate with the field device;
    a processing device configured to process data from the field device and control operations of the interface; and
    at least one galvanic isolation module configured to provide the channel to channel galvanic isolation.

12. The system of claim 10, wherein each channel is configured to receive multiple types of input or output signals from the field device.

13. The system of claim 10, wherein the at least one primary module and the at least one secondary module is configured to provide 1:N redundancy where N is a number of secondary modules.

14. The system of claim 10, wherein each channel further comprises a circuit configured to limit energy to the field device regardless of a type of input or output signal without reconfiguration.

15. The system of claim 14, wherein each of the at least one primary module and the at least one secondary module further comprises of voltage clamping circuit configured to limit a voltage applied on a plurality of channels.

16. The system of claim 10, wherein the back plane further comprises an energy limiting circuit.

17. The system of claim 10, wherein each of the at least one primary module and the at least one secondary module is configured to provide power isolation.

18. The system of claim 10, wherein each of the at least one primary module and the at least one secondary module is configured to provide data isolation.

* * * * *